United States Patent
Otsubo et al.

(10) Patent No.: US 6,285,145 B1
(45) Date of Patent: Sep. 4, 2001

(54) DRIVE CONTROL METHOD FOR VIBRATION WAVE MOTOR, DEVICE THEREFOR, AND APPARATUS AND IMAGE FORMING APPARATUS EQUIPPED WITH VIBRATION WAVE MOTOR

(75) Inventors: Toshihiko Otsubo, Numazu; Shinobu Arimoto, Yokohama; Tetsuro Fukusaka, Susono, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,038

(22) Filed: Jun. 28, 1999

(30) Foreign Application Priority Data

Jun. 30, 1998 (JP) .................................................. 10-183964

(51) Int. Cl.$^7$ ..................................................... H01L 41/08
(52) U.S. Cl. ................ 318/114; 310/323.03; 310/316.02
(58) Field of Search .................................. 318/114, 116; 310/323.03, 316.02

(56) References Cited

U.S. PATENT DOCUMENTS

| 5,159,253 | 10/1992 | Shimizu et al. ..................... 318/606 |
| 5,165,047 | 11/1992 | Shimizu ............................... 318/116 |
| 5,955,799 | * 9/1999 | Amaya et al. ......................... 310/36 |

FOREIGN PATENT DOCUMENTS

| 58-148682 | 9/1983 | (JP) . |
| 59-204477 | 11/1984 | (JP) . |
| 60-176470 | 9/1985 | (JP) . |
| 63-1379 | 1/1988 | (JP) . |
| 3-239170 | 10/1991 | (JP) . |
| 3-256579 | 11/1991 | (JP) . |
| 4-210788 | 7/1992 | (JP) . |

OTHER PUBLICATIONS

European Search Report (Ref. No. PT/2666230) dated Oct. 14, 1999.

* cited by examiner

*Primary Examiner*—Nestor Ramirez
*Assistant Examiner*—Judson H. Jones
(74) *Attorney, Agent, or Firm*—Fitzpatrick, Cella, Harper & Scinto

(57) ABSTRACT

In a control device for a vibration wave motor, in the case where the device executes an operation involving a large variation in the load while the motor is controlled at a target speed by the driving frequency using a feedback system, such feedback control is inhibited or the response of the feedback control is restricted in order to avoid the drawback resulting from feedback control at the time of generation of the variation in the load.

33 Claims, 10 Drawing Sheets

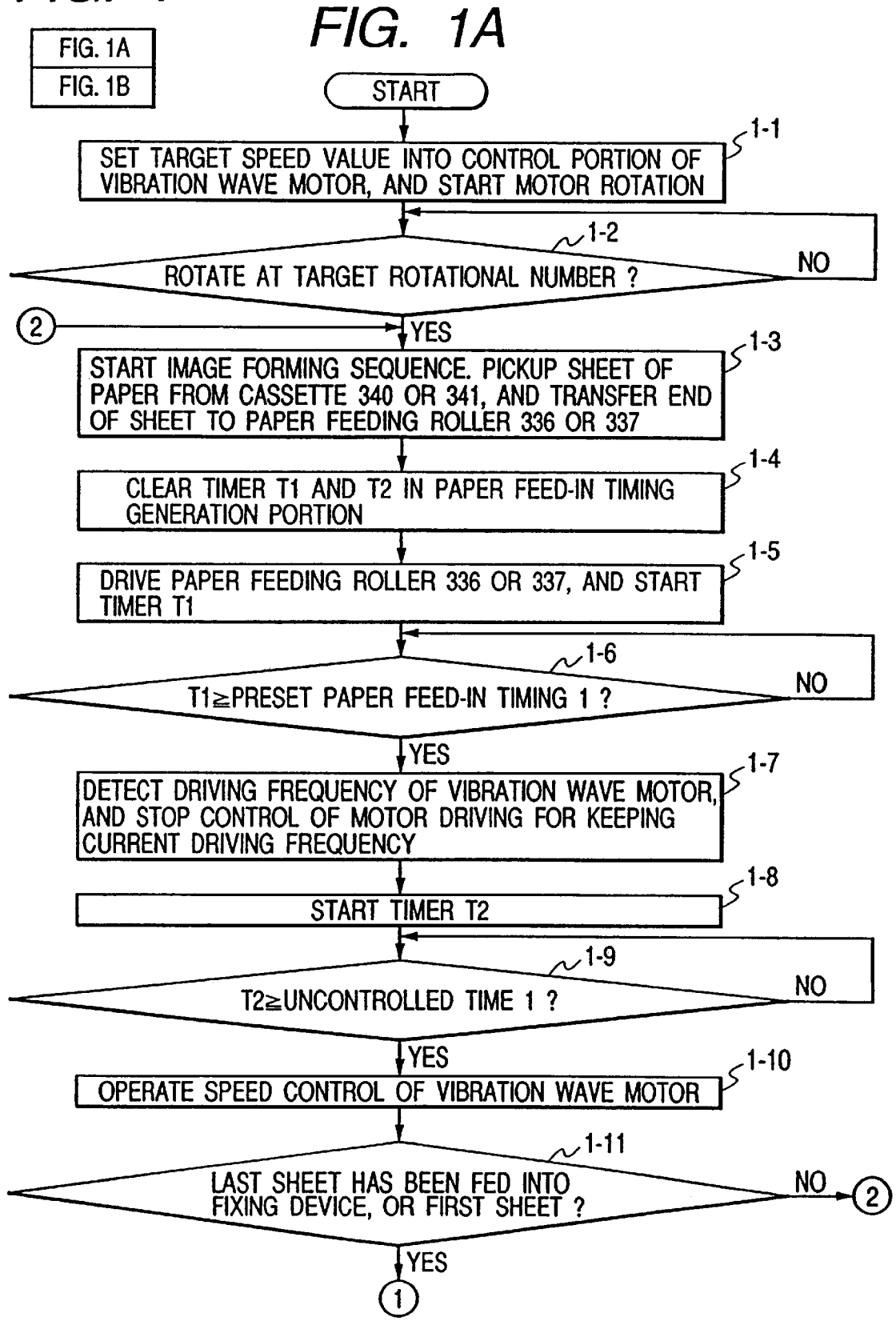

DRIVE CONTROL METHOD FOR VIBRATION WAVE MOTOR, DEVICE THEREFOR, AND APPARATUS AND IMAGE FORMING APPARATUS EQUIPPED WITH VIBRATION WAVE MOTOR

BACKGROUND OF THE INVENTION

1. Field of the Invention

The present invention relates to a drive control method for a vibration wave motor, a drive control device for a vibration wave motor, and an apparatus and an image forming apparatus equipped with a vibration wave motor and is applicable to an electrophotographic apparatus such as a printer, a copying apparatus or a facsimile apparatus in which a photosensitive drum or a transfer member such as a transfer belt or a transfer drum is rotated by means of a vibration wave motor, which constitutes drive means with satisfactory rotation accuracy.

2. Related Background Art

The vibration wave motor is, as described in Japanese Patent Application Laid-open No. 58-148682, to excite plural vibrations in a vibration member using periodic signals which have frequencies generally above the audible range, and to obtain a driving force by synthesizing such vibrations, and is capable of realizing stable rotation with a constant speed, e.g., by a driving method as disclosed in Japanese Patent Application Laid-open Nos. 63-1379, 60-176470, and 59-204477.

The vibration wave motor is, for example, provided with an annular shaped vibration member, a movable member maintained in contact with the annular vibration member by pressurizing means, and an output shaft connected to the movable member. On a face of the annular elastic member constituting the vibration member, there is adhered a piezoelectric element serving as an electromechanical energy conversion element, and frequency signals different in phase are applied to two driving elements of different positional phases formed in the piezoelectric element to excite a driving wave (for example a traveling wave formed by the synthesis of vending vibrations) in the elastic member, thereby driving, by friction, the movable member maintained in pressure contact with the driving surface of the elastic member in which such driving wave is excited, thus rotating the output shaft.

The drive control device for driving and controlling such a vibration wave motor compares the information detected from a rotation detector, such as an encoder composed for example of a photocoupler and a slit plate and adapted to rotation of the vibration wave motor or of a member driven by the vibration wave motor, with a target speed and executes feedback control for attaining the target speed by controlling for example the frequency of the signals applied to the above mentioned driving elements. The drive control is executed in a frequency range higher than the resonance frequency because the driving frequency and the revolution (rotation speed) is correlated so that the speed becomes highest at the resonance frequency and shows a very steep change in the frequency range lower than the resonance frequency but a relatively mild change in the frequency range higher than the resonance frequency. Consequently if the frequency is increased, the rotational speed becomes lower and if the frequency is decreased, the rotational speed becomes higher.

Such a vibration wave motor has been proposed as the drive source of various apparatus, for example for driving plural photosensitive drums (arranged at a predetermined pitch in the transporting direction of the recording material such as a recording sheet) in a color electrophotographic apparatus as an image forming apparatus, or an endless conveyor belt for continuously transporting the recording paper to the image transfer positions of the plural photosensitive drums.

In such prior technology, in the case of driving the photosensitive drum or the recording sheet conveyor belt using the vibration wave motor with an appreciable rotational precision, when the recording sheet enters the conveyor belt or when the recording sheet on the conveyor belt enters, after the image transfer step, the nip between the heating roller and the pressure roller of the fixing device for fixing the unfixed toner image on the recording sheet upon heating, there is generated an instantaneous variation of the load because the front end of the recording sheet receives the transporting force of the nip.

In the case of detecting the revolution of the motor or the driven member, and controlling the speed of the vibration wave motor at a predetermined speed by the drive control device, if the load is abruptly increased in the instantaneous variation of the load, the vibration wave motor increases the driving speed by a rapid decrease of the driving frequency applied to the motor, in order to increase the torque in response to the load.

Therefore the driving stability of the vibration wave motor is perturbed to deteriorate the quality of the image, and the vibration wave motor may eventually reach a frequency region where the motor cannot be driven, whereby the motor may be stopped.

SUMMARY OF THE INVENTION

One aspect of the present invention is to provide a driving method for the vibration wave apparatus capable of continuing a drive operation of the vibration wave motor in the case where an instantaneous variation is generated in the load.

One aspect of the present invention is to provide a driving device for the vibration wave apparatus capable of continuing a drive operation of the vibration wave motor in the case where an instantaneous variation is generated in the load.

One aspect of the present invention is to provide an apparatus provided with a vibration wave motor capable of securing the drive of the driven member in the case where an instantaneous variation is generated in the load of the vibration wave motor which drives the driven member.

One aspect of the present invention is to provide an image forming apparatus capable of not deteriorating the quality of an image formed in the case where an instantaneous variation is generated in the load of the vibration wave motor used for driving the photosensitive drum or the recording sheet conveyor belt.

One aspect of the present invention is, in a drive control method or device for a vibration wave motor in which a detected drive state is compared with a target value and feedback control is executed on the driving frequency signal applied to the vibration wave motor so that the drive state reaches a target value, to drive the vibration wave motor, in the case of a variation in the load, with a driving frequency signal used prior to such variation in the load but not used in feedback control, while such variation in the load continues.

One aspect of the present invention is, in a drive control method or device for a vibration wave motor with drive state detection means for detecting the drive state of the vibration wave motor and control means for comparing the value detected by the drive state detection means with a predetermined target value and varying the output value of the driving frequency signal applied to the vibration wave motor so that the drive state reaches a target value, to drive the vibration wave motor by the control means, in the case of a variation in the load, with a lowered response of the feedback control, while such variation in the load continues.

Still other aspects of the present invention, and the features thereof, will become fully apparent from the following description of the embodiments, to be taken in conjunction with the attached drawings.

DESCRIPTION OF THE PREFERRED EMBODIMENTS

[First Embodiment]

FIGS. 1A and 1B and FIGS. 2 to 4 illustrate a first embodiment of the present invention.

Figure 4:
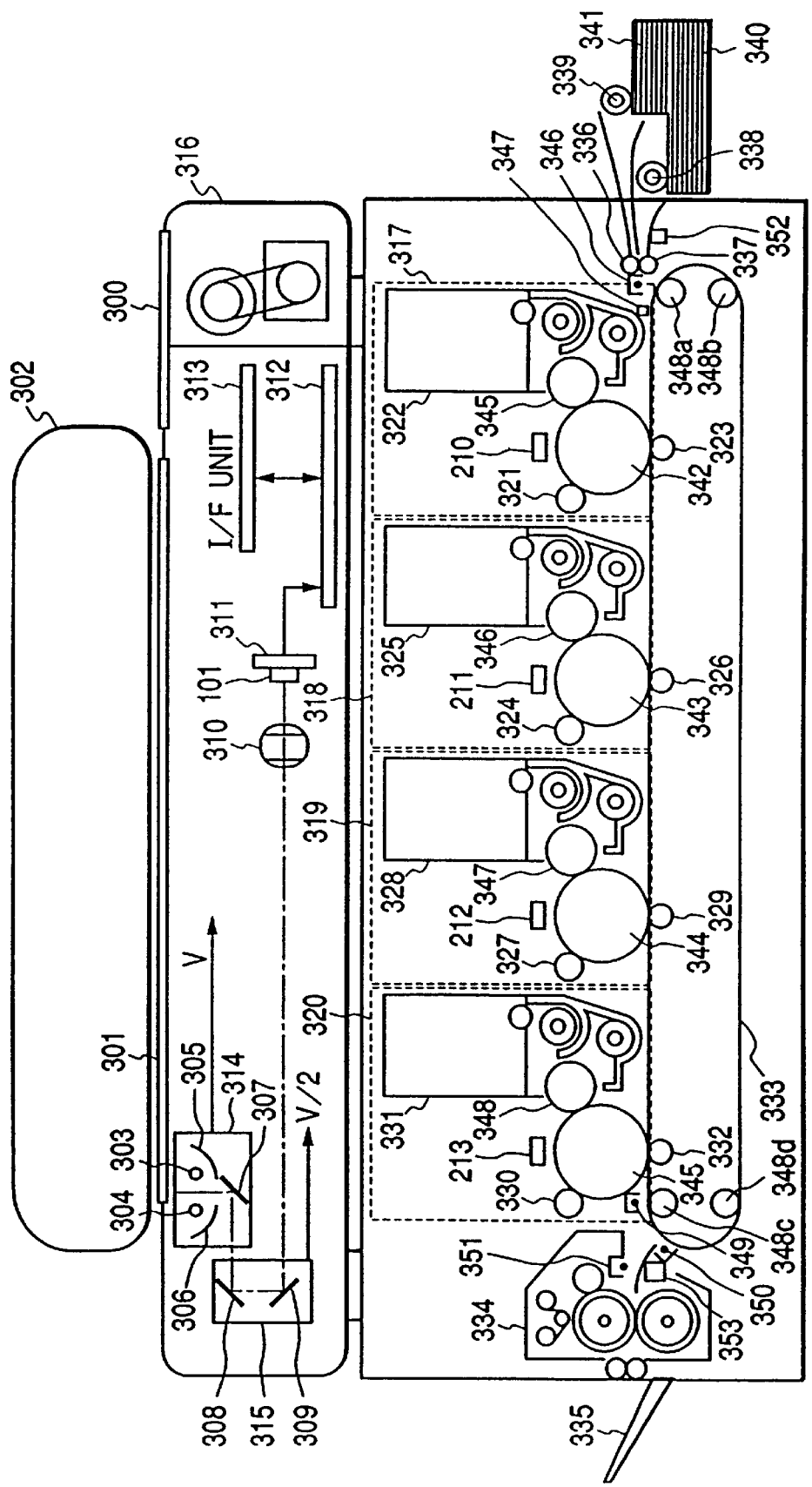
FIG. 4 is a schematic view showing the configuration of an image forming apparatus constituting the first embodiment of the present invention.

FIG. 4 schematically shows the entire configuration of a color image forming apparatus. At first there will be explained the configuration of a color reader unit.

There are shown a CCD 101; a board 311 on which the CCD 101 is mounted; a printer process unit 312; a glass plate (platen) 301 for supporting the original; an original feeding device 302 (which may by replaced by an unrepresented pressure plate of mirror surface or white color); light sources 303, 304 such as halogen lamps or fluorescent lamps for illuminating the original; reflectors 305, 306 for collecting the light from the light sources 303, 304 to the original; mirrors 307 to 309; and a lens 310 for condensing the reflected or projected light from the original onto the CCD 101.

There are also shown a first carriage 314 housing the halogen lamps 303, 304, reflectors 305, 306 and mirror 307; a second carriage 315 housing the mirrors 308, 309 and an interface (I/F) 313 with another IPU etc. The first carriage 314 is mechanically driven with a velocity V while the second carriage 315 is driven with a velocity V/2 in a direction perpendicular to the electrical scanning direction (main scanning direction) of the CCD 101 to scan (sub scan) the entire area of the original.

A printer unit shown in FIG. 4 is constructed as follows. There are provided a magenta (M) image forming unit 317; a cyan (C) image forming unit 318; a yellow (Y) image forming unit 319; and a black (K) image forming unit 320. As these units are constructed in identical manner, there will be explained the M image forming unit 317 only in the following.

In the M image forming unit 317, there are provided a photosensitive drum 342 on which a latent image is formed by the light from an LED recording head 210; a primary charger 321 for charging the surface of the photosensitive drum 342 at a predetermined potential as a preparatory step for latent image formation; and a developing unit 322 for developing the latent image on the photosensitive drum 342 thereby forming a toner image. The developing unit 322 includes a sleeve 345 which receives a developing bias voltage for the development.

A transfer charger 323 executes discharge from the rear side of a recording sheet conveyor belt 333 thereby transferring the toner image from the photosensitive drum 342 onto a recording sheet supported on the conveyor belt 333. In the present embodiment, there is not provided a cleaner unit for removing the toner remaining on the photosensitive drum after the image transfer because of the high image transfer efficiency, but such cleaner unit may naturally be provided without any inconvenience.

In the following there will be explained the sequence of transferring the toner image onto the recording material such as paper. The recording material such as recording paper, contained in a cassette 340 or 341, is individually picked up by a pickup roller 339 or 338 and supplied by paired feed rollers 336, 337 onto the recording material conveyor belt 333.

The supplied recording sheet is charged by an attraction charger 346. In the present embodiment, among belt rollers 348a to 348d for the recording sheet conveyor belt, the roller 348a is used as the driving roller for the conveyor belt and also for charging the recording sheet in cooperation with the attraction charger 346, thereby attracting the recording sheet to the conveyor belt 333. However, any of other belt rollers 348 may be used as the driving roller for driving the conveyor belt 333, or there may be provided a driving roller for driving the conveyor belt 333 at the other side (at the side of the fixing unit 334).

A sheet front end sensor 347 serves to detect the front end of the recording sheet on the conveyor belt 333. The detection signal of the sheet front end sensor 347 is supplied from the printer unit to the color reader unit and is utilized as the sub scan synchronization signal for the transmission of the video signal from the color reader unit to the printer unit.

Subsequently the recording sheet is transported by the conveyor belt 333 and is subjected to the formation of toner images in the image forming units 317 to 320 in the order of M, C, Y and K colors. After passing the K image forming unit 320, the recording sheet is subjected to charge elimination by a charge eliminator 349 in order to facilitate separation from the conveyor belt 333 and is separated therefrom. A separation charger 350 is provided for preventing the image perturbation resulting from the peeling discharge at the separation of the recording sheet from the conveyor belt 333. The separated recording sheet is charged by pre-fixing chargers 351 in order to supplement the attractive force of the toner, thereby preventing the perturbation in the image, then subjected to thermal fixation of the toner images in the fixing unit 334 and is discharged to a sheet discharge tray 335. There is also provided a sensor 353 for detecting the recording sheet.

In the present embodiment, vibration wave motors are employed for rotating the photosensitive drums 342 to 345, and a vibration wave motor is also employed for rotating the driving roller for driving the recording sheet conveyor belt 333.

As explained in the foregoing, the vibration wave motor utilizes plural vibrations excited in the vibration member with frequencies generally in the ultrasonic region, and the driving frequency, driving voltage or pulse width thereof is controlled according to the speed detection signal, detected by a speed sensor for detecting the motor driving speed, for achieving stable rotation at a constant speed.

In the following there will be explained the features of the present embodiment with reference to FIGS. 1A, 1B, 2 and 3.

Figure 1B:
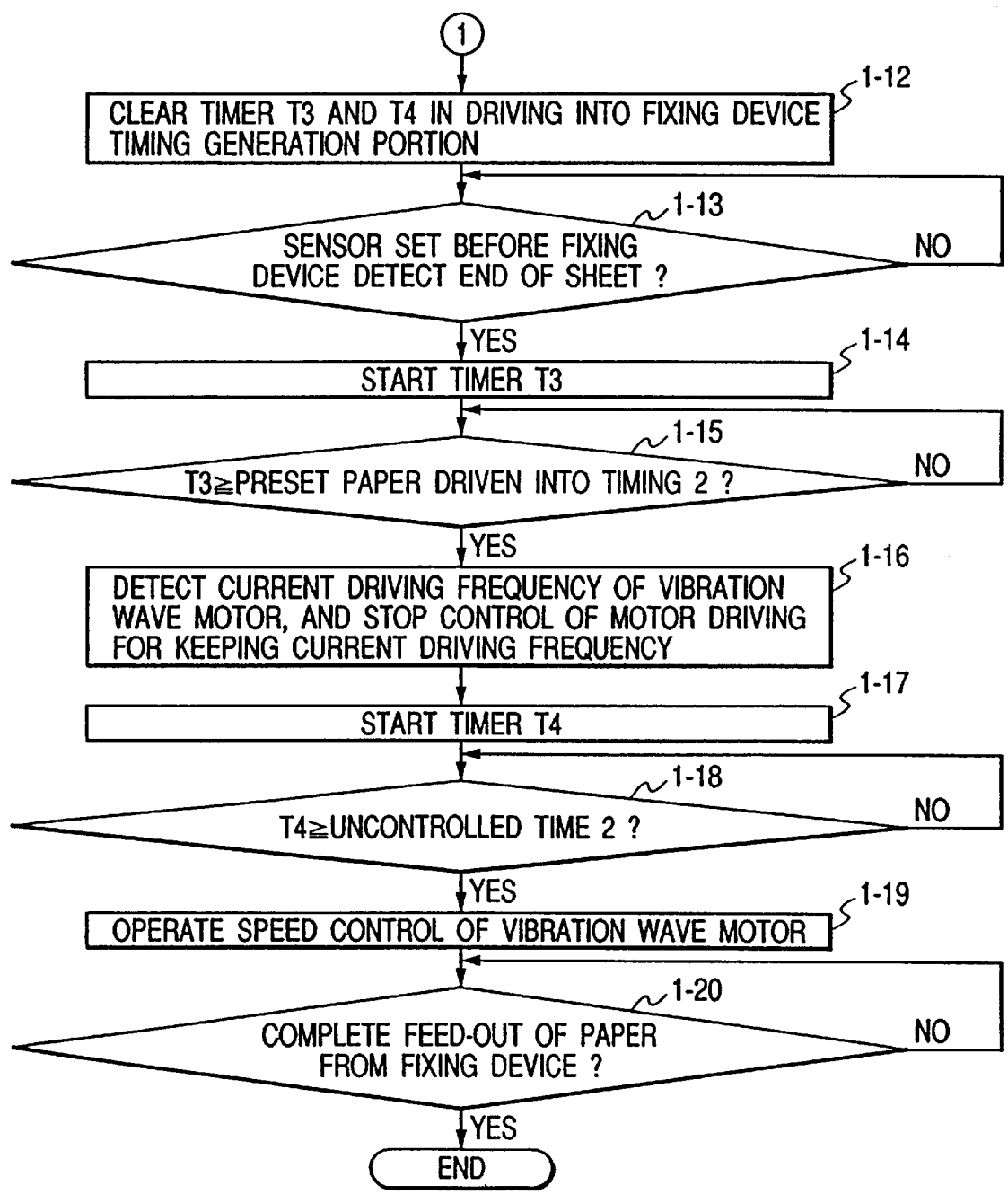
FIG. 1 is comprised of FIGS. 1A and 1B illustrating flow charts showing the function of a first embodiment of the present invention.
Figure 2:
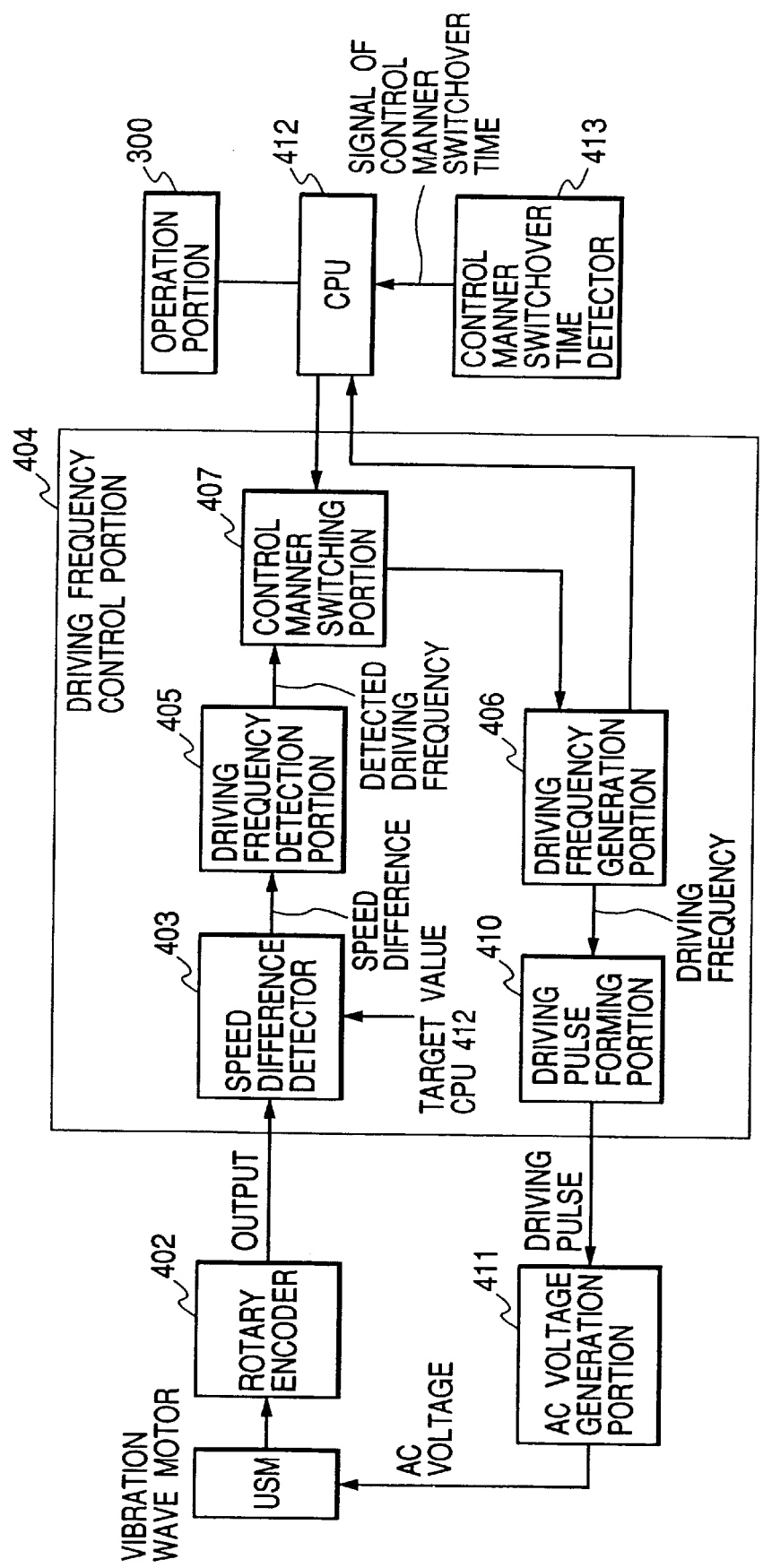
FIG. 2 is a block diagram showing the control system of the first embodiment of the present invention.
Figure 3:
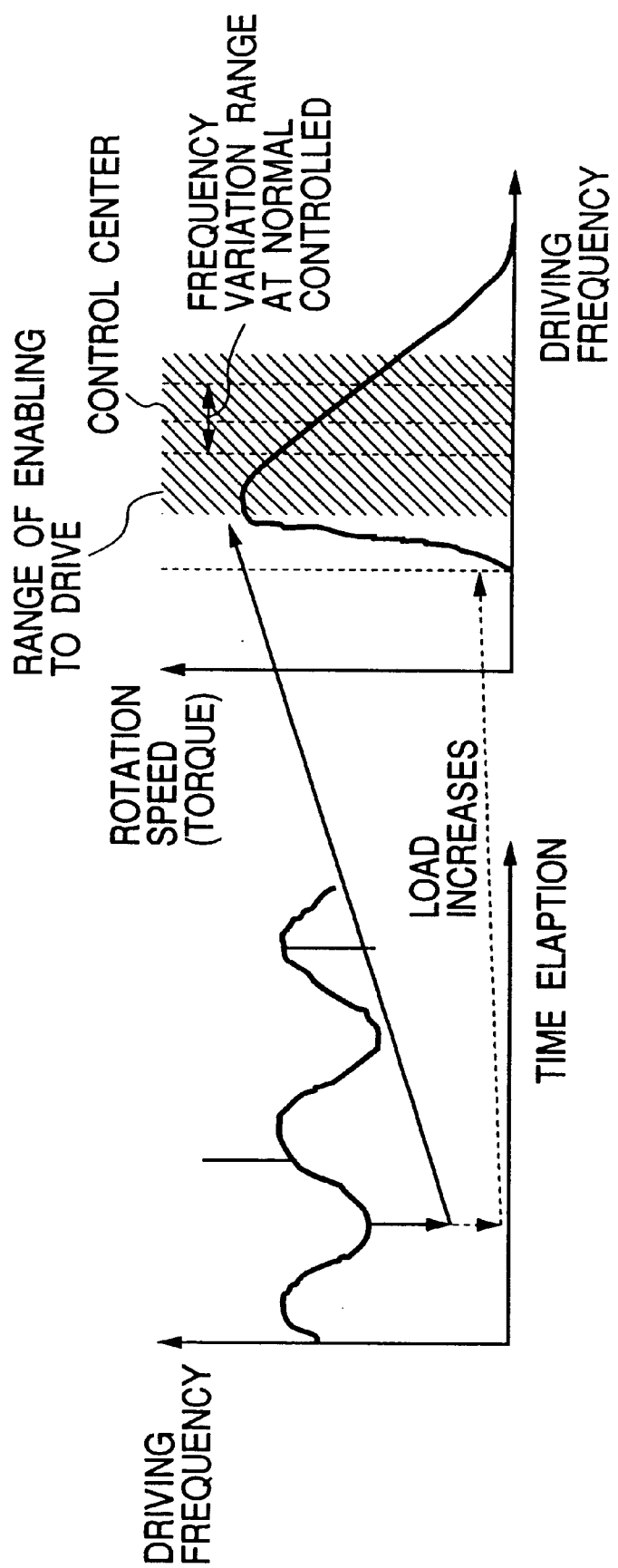
FIG. 3 is a chart showing the relationships between the load variation and the frequency and between the rotation torque and the drive frequency.

FIGS. 1A and 1B are flow charts showing the functions featuring the present embodiment, while FIG. 2 is a block diagram of a drive control device for the vibration wave motor, and FIG. 3 is a chart showing the behavior of the driving pulses for the vibration wave motor in the control thereof.

Referring to the flow charts shown in FIGS. 1A and 1B, when an image forming operation is instructed from an operation portion 300, there are activated the motors for driving the drum and the recording sheet conveyor belt and an unrepresented motor for sheet feeding from the cassette and for driving the fixing belt. In the following there will be explained the control sequence principally of the control device for the vibration wave motor.

A control portion 404 shown in FIG. 2 executes speed control normally by driving frequency control according to the speed difference detected by a speed difference detector 403, but, in periods of steps 1-7 to 1-10 and steps 1-16 to 1-19, the driving frequency control according to the speed difference is replaced by the drive control with the frequency employed immediately before the execution of step 1-7 or 1-16.

In a step 1-1, a CPU 412 sets a target speed value for the control portion of the vibration wave motor (in the present embodiment, the vibration wave motor for driving each photosensitive drum or for image transfer) to a speed difference detector 403 of a driving frequency control portion 404.

The vibration wave motor USM (applying frequency signals to electromechanical energy conversion elements such as piezoelectric elements provided on the vibration member to induce vibrations therein thereby obtaining a driving force) has a lower revolution with a higher driving frequency as shown in FIG. 3. Therefore, in starting the vibration wave motor, the predetermined revolution is reached by gradually decreasing the frequency from a predetermined frequency.

The driving frequency control portion 404 compares the signal from an encoder 402 with the target value, and decreases or increases the driving frequency respectively in the case where the speed detected at a driving frequency detecting portion 405 is lower or higher, so that the output of the encoder coincides with (or comes close to) the target speed.

In a step 1-2, it is discriminated whether the target revolution has been reached, and, if reached, in a step 1-3, the image forming sequence is initialized. For this purpose the recording material such as paper is fed from a cassette (not shown but replaceable by other sheet feeding means), and a sensor 352 positioned in front of the sheet feeding rollers 336, 337 detects whether the sheet has arrived. When the front end of the sheet arrives, the sheet is advanced by a predetermined length by the feeding rollers 336, 337 to a predetermined position.

Then, in a step 1-4, sheet feeding is executed, and a timer T1 for judging the timing of shock (instantaneous load variation) given by the recording sheet to the conveyor belt 323 and a timer T2 for judging the timing control switching are cleared. Thus, as the sheet feeding operation and the image forming operation proceed according to predetermined schedules, it is possible to predict the time of arrival of the recording sheet at the conveyor belt.

In the configuration of the present embodiment, the variation in the load is assumed to be induced in the conveyor belt 333 when the sheet is attracted there, but, in other configurations, there may be executed a similar process at the timing of such variation in the load.

In a step 1-5, a drive operation of the sheet feeding rollers 336, 337 is started, and the timer T1 is activated.

In a step 1-6, it is determined whether the value of the timer T1 reaches a preset paper feed-in or arrival time 1 at which the load variation occurs and discriminates a timing immediately before the feeding-in or arrival of the paper, and in a step 1-7, the current driving frequency of the vibration wave motor before the shock is given to the conveyor belt 333 when the arrival of the paper is detected, the detected frequency is set in a control mode switching portion 407 and the driving frequency supplied from the driving frequency detecting portion 405 is switched to thus set frequency for supply to a driving frequency generation portion 406.

Consequently, the driving pulses are outputted continuously at the set frequency. Therefore, even in the case of an abrupt variation in the load, possibly exceeding the controlled range, the control does not diverge and the rotation continues substantially with the predetermined revolution. As this control is required only for a short period of time at the time of sheet arrival, in a step 1-8, the timer T2 is simultaneously started with the start of the above-mentioned control, in order to measure the uncontrolled time 1. The uncontrolled time 1 is the duration of the shock, and, when the lapse of the uncontrolled time 1 is discriminated in a step 1-9, the control mode switching portion 407 switches, in a step 1-10, the mode to the control by the signal from the driving frequency detecting portion 405.

In the case of a continuous image forming operation (for forming plural copies), the sequences proceed in parallel manner, so that the feeding of the next sheet is started from the step 1-3 while the sequence proceeds to a step 1-11.

In a step 1-11, since the preceding sheet may not have arrived into the image fixing device, the operation of the sequence is stopped until the pre-fixing sensor 353 detects the entry of the preceding sheet into the fixing device.

As this step is not required for the first sheet, the sequence proceeds to a step 1-12.

The timers T3, T4 of a fixing timing generation portion are cleared in a step 1-12, since the sequence starting from the step 1-12 is the same as that of the aforementioned steps 1-4 to 1-10 and serves to avoid the shock caused by the sheet at the entry into the fixing device.

In a step 1-13, it is discriminated whether the front end of the sheet has arrived at the sensor 353 positioned in front of the fixing device.

When the front end of the sheet is detected, the timer T3 is started in a step 1-14. There is then measured a present paper feeding-in or arrival time 2 defining the time required by the sheet front end to proceed from the pre-fix sensor 353 to the fed-in portion of the fixing device, and, before the entry of the sheet into the fixing device, the current driving frequency of the vibration wave motor is detected in a step 1-16. Then the detected frequency is set in the control mode switching portion, and the driving frequency is switched from the frequency given by the driving frequency detection portion 405 to thus set frequency and is given to the driving frequency generation portion 406.

Consequently, the driving pulses are output continuously at the set frequency. Therefore, even in the case of an abrupt variation in the load, possibly exceeding the controlled range, the control does not diverge and the rotation continues substantially with the predetermined revolution. As this control is required only for a short period at the sheet arrival, the timer T4 is simultaneously started with the start of the above-mentioned control in a step 1-17, in order to measure the uncontrolled time 2.

The uncontrolled time 2 is the duration of the shock, and, when the lapse of the uncontrolled time 2 is discriminated in a step 1-18, the control mode switching portion 407 switches, in a step 1-19, the mode to control by the signal from the driving frequency detecting portion 405.

The discharge of the sheet from the fixing device is awaited in a step 1-20 and then an ending sequence, for example stopping the motors, etc, is executed.

As the present embodiment employs five vibration wave motors, the block of the vibration wave motor, rotary encoder, driving frequency control portion 404 and AC voltage generation unit 411 shown in FIG. 2 is provided in five units. The vibration wave motor and the rotary encoder are connected coaxially, and the rotary encoder outputs a speed signal according to the rotation of the vibration wave motor.

The speed signal is compared with the target value in the speed difference detector 403 to obtain the difference, and the obtained speed difference signal is used in the driving frequency detection portion 405 for determining the driving frequency so as to decrease or increase the driving frequency in the case of increasing or decreasing the speed, and the detected driving frequency is supplied to the control mode switching portion 407.

The control mode switching portion 407 selects either the detected driving frequency or the frequency set by the CPU 412, and causes the driving frequency generating portion 406 to generate the driving frequency. Then the driving pulse generation portion 410 generates pulses to be actually given to the vibration wave motor, and the pulses are power amplified by the AC voltage generation portion 411 and are supplied to the vibration wave motor.

[Second Embodiment]

Figures 5, 5A:
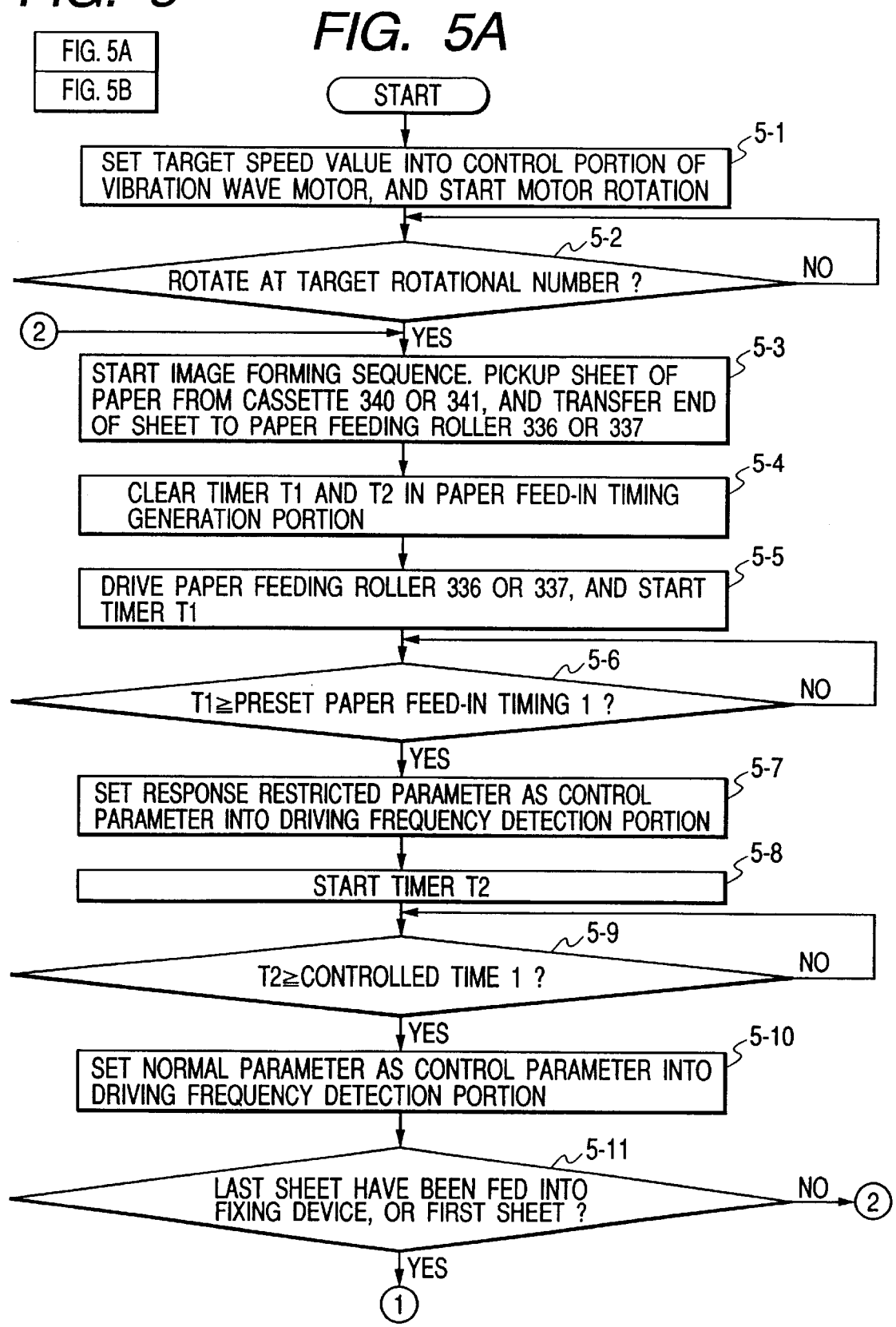
FIG. 5 is comprised of FIGS. 5A and 5B illustrating flow charts showing the function of a second embodiment.
Figure 5B:
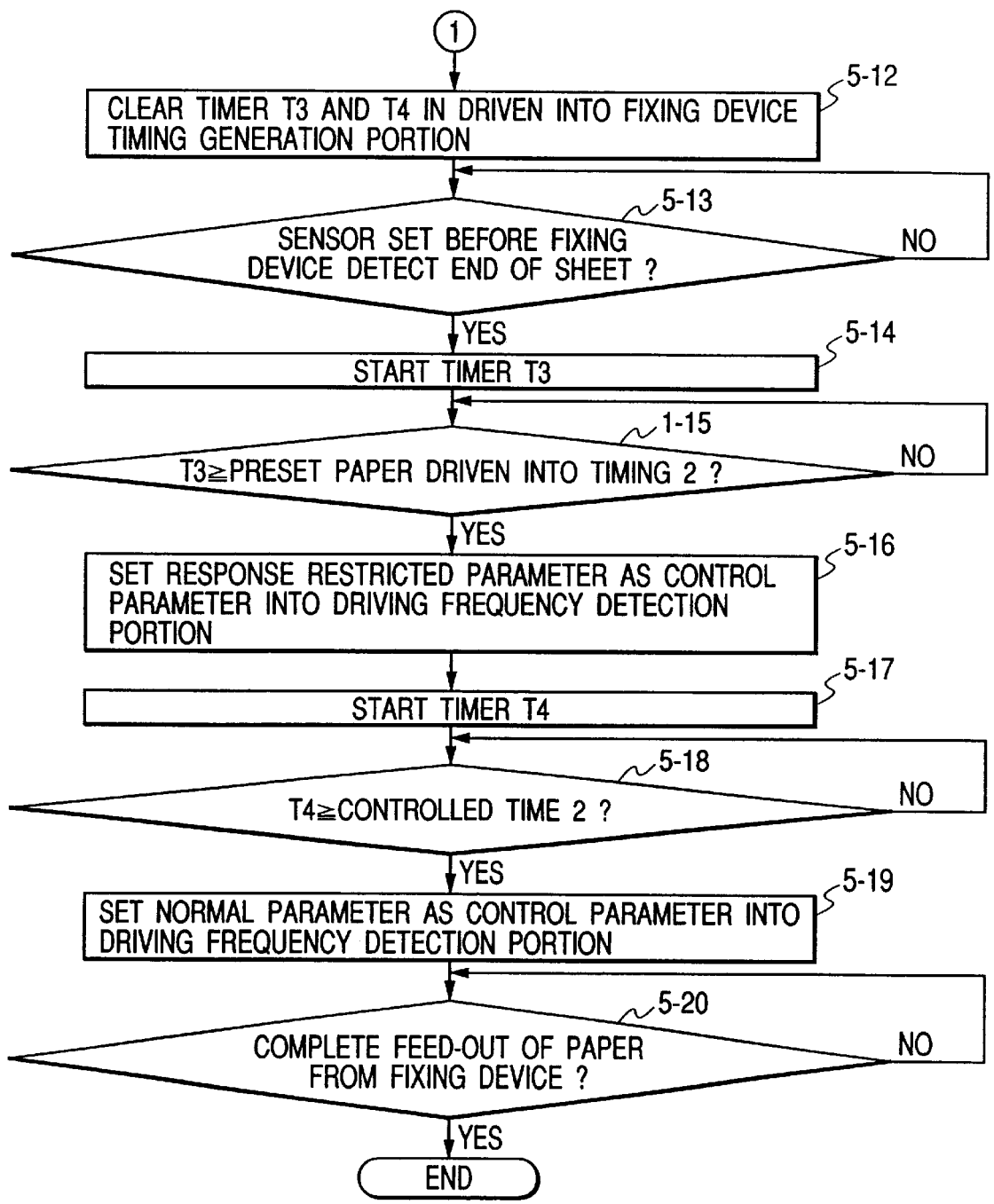
Figure 6:
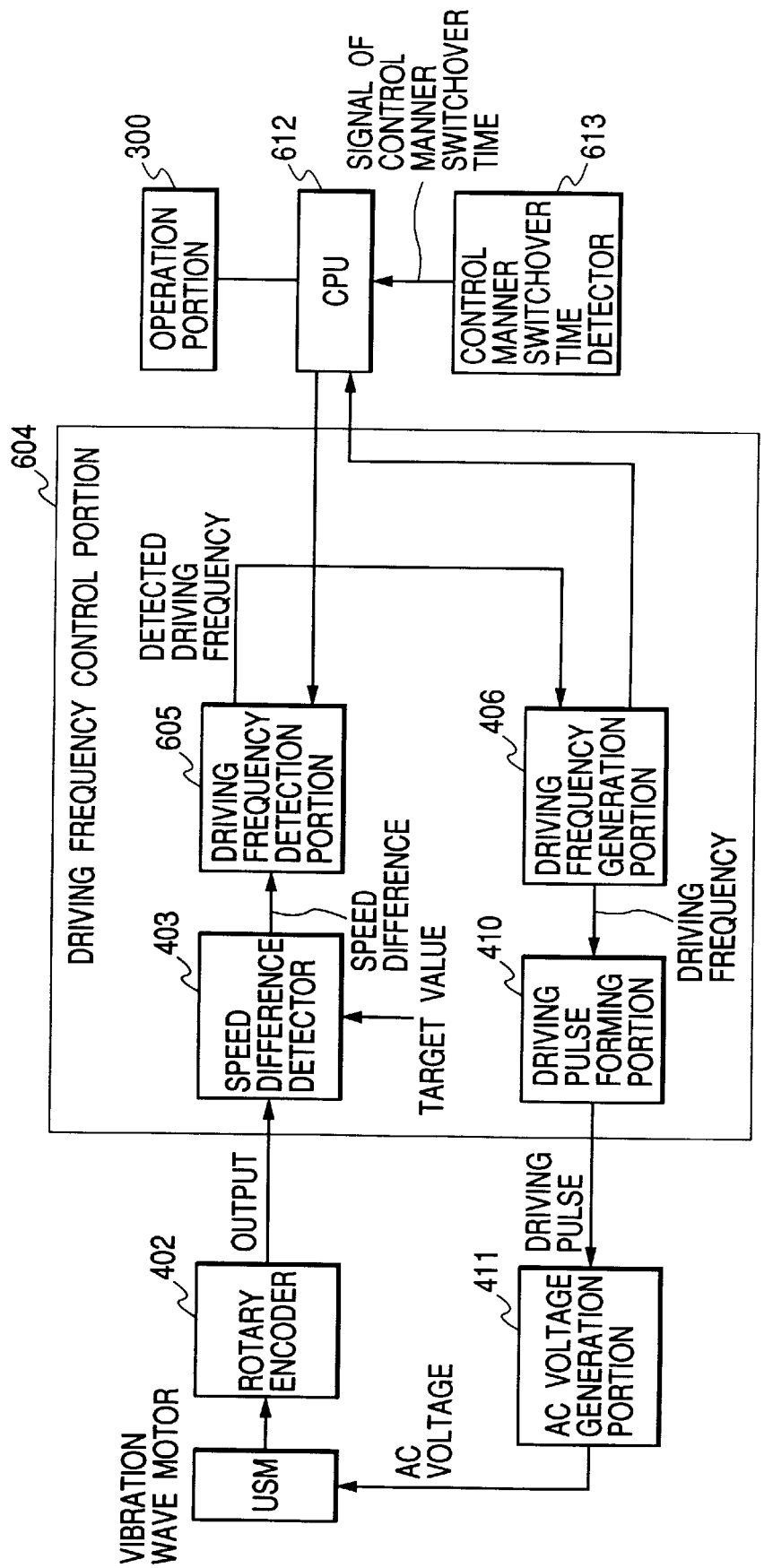
FIG. 6 is a block diagram showing the control system of the second embodiment.

FIGS. 5A, 5B and 6 illustrate a second embodiment, respectively showing flow charts and the control unit for the vibration wave motor.

Figure 8:
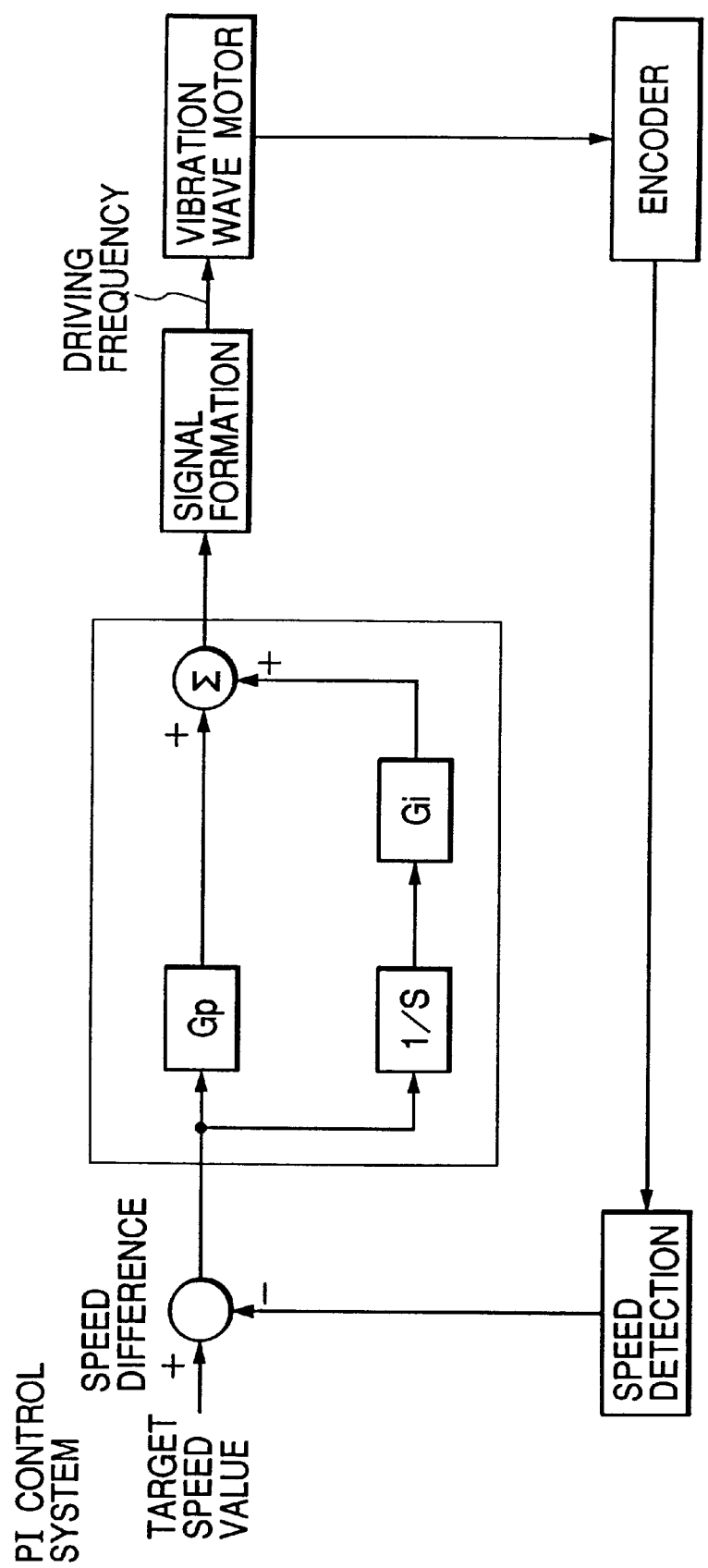
FIG. 8 is a block diagram showing the PI control system of the second embodiment.

The present embodiment is to set, in the driving frequency detection portion, a parameter for restricting the response in control during the period in which the vibration wave motor is subjected to an instantaneous load increase, as will be explained in the following with reference to FIG. 8. The response in control is variable depending on the control method, and an example of the PI control is shown in FIG. 8. The control signal is represented by:

$$V_D \times G_P + (1/S) V_D \times G_i$$

wherein $V_D$ is the speed difference. A larger signal increases the correction amount.

If $G_P$ and $G_i$ increase with respect to the speed difference $V_D$, the control signal increases, so that the response becomes faster by an increase in $G_P$ or $G_i$. The controlling parameter is different depending on the actual drive control system, but, in the present embodiment, $G_i$ is changed so as to restrict the response. This is naturally limited to the present embodiment, and the restriction of response may naturally be achieved not only by the parameter $G_P$, $G_i$ but, in other control systems (for example a PID control or a combination thereof), by certain parameters to be multiplied with the deviation values.

Now referring to the flow charts shown in FIGS. 5A and 5B, at first there are activated the vibration wave motors for driving the plural photosensitive drums, that for driving the recording sheet conveyor belt and another unrepresented motor for sheet feeding from the cassette and for driving the fixing belt. In the following there will be explained the control sequence principally of the control device for the vibration wave motor.

A control portion 604 shown in FIG. 6 constantly executes driving frequency control according to the speed difference detected by a speed difference detector 403, and, in periods of steps 5-7 to 5-10 and steps 5-16 to 5-19, the aforementioned driving frequency control with such control parameters as to restrict the response.

In a step 5-1, a CPU 612 sets a target speed value for the control portion of the vibration wave motor (in the present embodiment, four vibration wave motors for driving the photosensitive drums, and the vibration wave motor for driving the recording sheet conveyor belt) to a speed difference detector 403 of a driving frequency control portion 604.

The vibration wave motor USM has a lower revolution with a higher driving frequency as shown in FIG. 3. Therefore, in starting the vibration wave motor, the predetermined revolution is reached by gradually decreasing the frequency from a predetermined frequency.

The control portion 604 compares the signal from an encoder 402 with the target value, and decreases or increases the driving frequency respectively in the case where the speed detected at a driving frequency detecting portion 605 is lower or higher, so as that the output of the encoder coincides with (or comes close to) the target speed.

In a step 5-2 it is discriminated whether the target revolution has been reached, and, if reached, the image forming sequence is initialized in a step 5-3.

For this purpose the recording paper is fed from a cassette (not shown but replaceable by other sheet feeding means), and a sensor 352 positioned in front of the sheet feeding rollers 336, 337 detects whether the sheet has arrived. When the front end of the sheet arrives, the sheet is advanced by a predetermined length by the feeding rollers 336, 337 to a predetermined position.

Then sheet feeding is executed in a step 5-4, and a timer T1 for judging the timing of shock given by the recording sheet to the conveyor belt 333 and a timer T2 for switching the control are cleared.

In the configuration of the present embodiment, a variation in the load is assumed to be induced in the conveyor belt 333 when the sheet is attracted there, but, in other configurations, there may be executed a similar process at the timing of such variation in the load.

In a step 5-5 a drive operation of the sheet feeding rollers 336, 337 is started, and the timer T1 is activated.

In a step 5-6, it is determined whether the value of the timer T1 reaches a preset paper feed-in or arrival time 1 at which the load variation occurs and discriminates a timing immediately before the feeding-in or arrival of the paper, and in a step 5-7, control parameters for the restricted response of the vibration wave motor are set in the driving frequency detection portion 605 before the shock is given to the conveyor belt 333 by the arrival of the paper. Therefore, even in the case of an abrupt variation in the load, possibly exceeding the controlled range, the control does not diverge and the rotation continues substantially with the predetermined revolution.

As this control is required only for a short period at sheet arrival, in a step 5-8, the timer T2 is simultaneously started with the start of the above-mentioned control, in order to measure the limited time 1. The limited time 1 is the duration of the shock, and, when the lapse of the limited time 1 is discriminated in a step 5-9, the control parameters of the driving frequency detection portion 605 is returned to the ordinary control parameters in a step 5-10.

In the case of a continuous image forming operation (for forming plural copies), the sequences proceed in parallel manner, so that the feeding of the next sheet is started from the step 5-3 while the sequence proceeds to a step 5-11.

In a step 5-11, since the preceding sheet may not have arrived into the image fixing device, the operation of the sequence is stopped until the preceding sheet enters the fixing device.

As this step is not required for the first sheet, the sequence proceeds to a step 5-12. The timers T3, T4 of a fixing timing generation portion are cleared in a step 5-12, since the sequence starting from the step 5-12 is same as that of the aforementioned steps 5-4 to 5-10 and serves to avoid the shock caused by the sheet at the entry into the fixing device.

In a step 5-13, it is discriminated whether the front end of the sheet has arrived at the sensor 353 positioned in front of the fixing device. When the front end of the sheet is detected, the timer T3 is started in a step 5-14. There is then measured a preset paper arrival time 2 defining the time required by the sheet front end to proceed from the pre-fix sensor to the arrival portion of the fixing device, and, before the entry of the sheet into the fixing device, the control parameters with restricted response is set in the driving frequency detection portion 605 in a step 5-16.

Therefore, even in the case of an abrupt variation in the load, possibly exceeding the controlled range, the control does not diverge and the rotation continues substantially with the predetermined revolution.

As this control is required only for a short period of time at the time of sheet arrival, the timer T4 is simultaneously started with the start of the above-mentioned control in a step 5-17, in order to measure the limited time 2. The limited time 2 is the duration of the shock, and, when the lapse of the limited time 2 is discriminated in a step 5-18, the control parameters of the driving frequency detection portion 605 is returned to the ordinary control parameters in a step 5-19.

The discharge of the sheet from the fixing device is awaited in a step 5-20 and then an ending sequence, for example stopping the motors, etc, is executed.

As the present embodiment employs five vibration wave motors, the block of the vibration wave motor, rotary encoder, driving frequency control portion 604 and AC voltage generation unit 411 shown in FIG. 6 is provided in five units. The vibration wave motor and the rotary encoder are connected coaxially, and the rotary encoder outputs a speed signal according to the rotation of the vibration wave motor. The speed signal is compared with the target value in the speed difference detector 403 to obtain the difference, and the obtained speed difference signal is used in the driving frequency detection portion 605 for determining the driving frequency according to the response parameters, so as to decrease or increase the driving frequency in the case of increasing or decreasing the speed.

In the first and second embodiments explained in the foregoing, in the case of an instantaneous excessive variation in the load as shown in FIG. 3, if the driving frequency is controlled with satisfactory response so as to improve the accuracy of rotation, the driving frequency shows an abrupt change, exceeding the ordinary controlled frequency range for the vibration wave motor and eventually leading to the stoppage of the motor.

However, such excessive variation in the load is mostly instantaneous, and, in the apparatus involving sheet feeding, the load generally increases instantaneously when the sheet enters or plunges into the driving system. By fixing the control of the vibration wave motor with the driving frequency prior to the instantaneous load variation, the characteristics in FIG. 3 change as shown in FIG. 7A, whereby the stoppage of the vibration wave motor can be prevented.

Figure 7B:
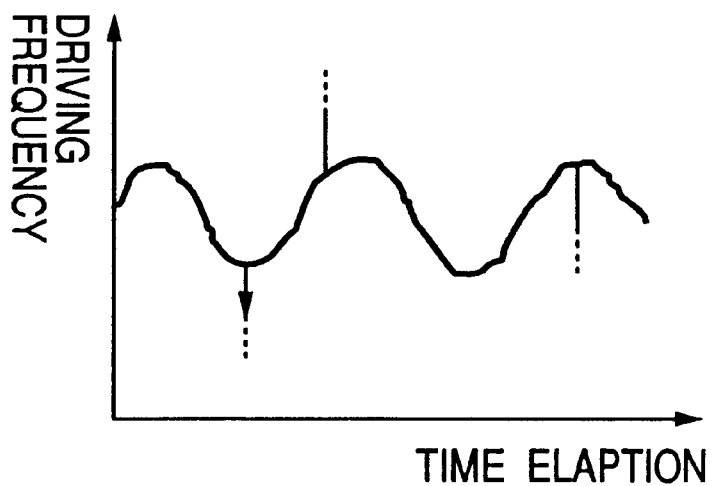
FIGS. 7A and 7B are charts showing the characteristics in function of the first and second embodiments.
Figure 7A:
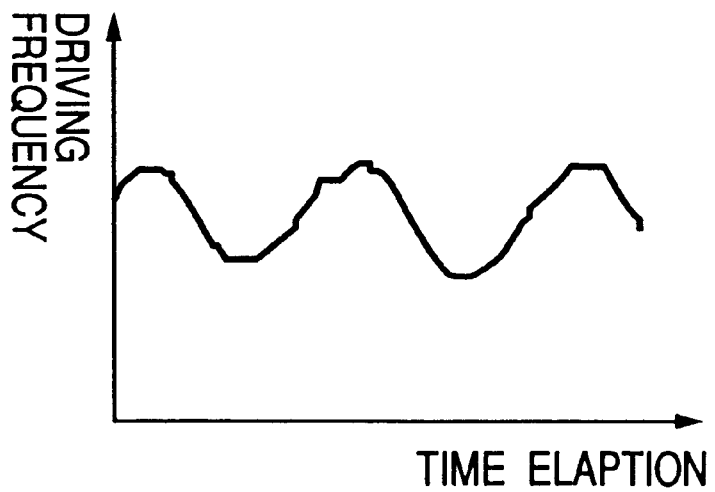

Otherwise the control gain is adjusted to restrict the response only during such instantaneous load variation, whereby the instantaneous response amount is reduced as shown in FIG. 7B, thereby decreasing the possibility of stoppage of the motor.

[Third Embodiment]

In addition to the foregoing embodiments, the control of inhibiting the change of the driving frequency or of varying the response parameters in the first or second embodiment may be executed only in the case where the frequency is shifted, by the abrupt load variation, to a faster rotation of the vibration wave motor (frequency region lower than the resonance frequency, where the vibration wave motor shows characteristic loss of control).

Otherwise, the control of inhibiting the change of the driving frequency or of varying the response parameters in the first or second embodiment may be executed only in the case where the frequency is shifted, by the abrupt load variation, to a slower rotation of the vibration wave motor.

Furthermore, the control of inhibiting the change of the driving frequency or of varying the response parameters in the first or second embodiment may be executed only in the case where the revolution of the vibration wave motor changes instantaneously.

Furthermore, the feedback control may also be achieved by a change in the driving voltage (duty ratio of the driving pulses) or the phase difference of the driving signals, instead of the driving frequency.

Furthermore, it is possible to selectively execute these processes.

Furthermore, it is possible to detect the variation in the load and to restrict the response during such variation.

What is claimed is:

1. A drive control method for a vibration wave motor in which a detected drive state is compared with a preset target value and feedback control is executed on a driving frequency signal applied to the vibration wave motor so that the drive state approaches the target value, the method comprising:

a step of executing the feedback control, and a step, in the case where a variation in a load is generated, of driving the vibration wave motor, during the variation, not by using the feedback control but by using the driving frequency signal applied prior to the generation of variation in the load.

2. A drive control method according to claim 1, wherein said drive state is a rotation speed.

3. A drive control method for a vibration wave motor in which a detected drive state is compared with a preset target value and feedback control is executed on a driving frequency signal applied to the vibration wave motor so that the drive state approaches the target value, the method comprising:

a step of executing the feedback control; and a step, for a predictable variation generation in a load, of driving the vibration wave motor, during the period of a predicted load variation, not by using the feedback control but by using the driving frequency signal applied prior to the generation of variation in the load.

4. A drive control method for a vibration wave motor in which a detected drive speed is compared with a preset target value and feedback control is executed on a driving frequency signal applied to the vibration wave motor so that the drive speed approaches the target value, the method comprising:

a step of executing the feedback control; and a step, in the case where a variation in a load is generated, of restricting a response of the feedback control.

5. A drive control method for a vibration wave motor in which a detected drive state is compared with a preset target value and feedback control is executed on a driving frequency signal applied to the vibration wave motor so that the drive state approaches the target value, the method comprising:

a step of executing the feedback control; and a step, for a predictable variation in a load, of restricting a response of the feedback control during the period of a predicted load variation.

6. A drive control device for a vibration wave motor comprising:

drive state detection means for detecting a drive state of the vibration wave motor; and control means for comparing a detection value detected by said drive state detection means with a preset target value and varying an output value of a driving frequency signal applied to the vibration wave motor so that the drive state approaches the target value;

wherein said control means is adapted, in the case where a variation in a load is generated, to drive the vibration wave motor, during the variation with the output value of the driving frequency signal applied prior to the generation of variation in the load.

7. A drive control device according to claim 6, wherein the drive state is a rotation speed.

8. A drive control device according to claim 6, wherein said control means is adapted to control a frequency of the driving frequency signal.

9. A drive control device according to claim 8, wherein said control means is adapted to function in an instantaneous variation state of the load abruptly decreasing the frequency of the driving frequency signal.

10. A drive control device according to claim 8, wherein said control means is adapted to function in an instantaneous variation state of the load abruptly increasing the frequency of the driving frequency signal.

11. A drive control device according to claim 8, wherein said control means is adapted to function in an instantaneous variation state of the load abruptly increasing or decreasing the frequency of the driving frequency signal.

12. A device according to claim 6, wherein said vibration wave motor generates a driving force by applying a frequency signal to an electromechanical energy conversion element.

13. A drive control device for a vibration wave motor comprising:

drive state detection means for detecting a drive state of the vibration wave motor; and control means for comparing a detection value detected by said drive state detection means with a preset target value and varying an output value of a driving frequency signal applied to the vibration wave motor so that the drive state approaches the target value;

wherein said control means is adapted, for a predictable variation generated in a load, of driving the vibration wave motor, during the period of a predicted load variation, with the output value of the driving frequency signal applied prior to the generation of variation in the load.

14. A device according to claim 13, wherein said vibration wave motor generates a driving force by applying a frequency signal to an electromechanical energy conversion element.

15. A drive control device for a vibration wave motor comprising:

drive state detection means for detecting a drive speed of the vibration wave motor;

control means for comparing a detection value detected by said drive state detection means with a preset target value and varying an output value of a driving frequency signal applied to the vibration wave motor so that the drive speed approaches the target value; and restriction means for restricting, in the case where a variation in a load is generated, a response of the feedback control of said control means during a period of the load variation.

16. A device according to claim 15, wherein said restriction means is adapted to restrict the response by varying a control parameter determining the response of the feedback control.

17. A device according to claim 15, wherein said vibration wave motor generates a driving force by applying a frequency signal to an electromechanical energy conversion element.

18. A drive control device for a vibration wave motor comprising:

drive state detection means for detecting a drive state of the vibration wave motor;

control means for comparing a detection value detected by said drive state detection means with a preset target value and varying an output value of a driving frequency signal applied to the vibration wave motor so that the drive state approaches the target value; and restriction means for restricting, for a predictable variation in a load, a response of the feedback control of said control means during the period of the predictable load variation.

19. A device according to claim 18, wherein said restriction means is adapted to restrict the response by varying a control parameter determining the response of the feedback control.

20. An apparatus according to claim 18, wherein said vibration wave motor generates a driving force by applying a frequency signal to an electromechanical energy conversion element.

21. An apparatus provided with a vibration wave motor comprising:

drive state detection means for detecting a drive state of the vibration wave motor;

a control circuit for effecting feedback control on a frequency signal applied to the vibration wave motor, based on a detection value detected by said detection means with a target value; and inhibition means for inhibiting the feedback control by said control circuit in a case where said apparatus executes, among plural operations therein, a predetermined operation involving a change in a drive load state.

22. An apparatus according to claim 21, wherein the frequency signal of a predetermined state is applied to said vibration wave motor during a period in which the feedback control is inhibited by said control circuit.

23. An apparatus according to claim 21, wherein said apparatus is an image forming apparatus.

24. An apparatus according to claim 23, wherein said image forming apparatus drives an image bearing member using a vibration wave motor.

25. An apparatus according to claim 21, wherein said vibration wave motor generates a driving force by applying a frequency signal to an electromechanical energy conversion element.

26. An apparatus provided with a vibration wave motor comprising:

drive state detection means for detecting a drive state of the vibration wave motor;

a control circuit for effecting feedback control on a frequency signal applied to the vibration wave motor, based on a detection value detected by said detection means with a target value; and restriction means for restricting a response in the feedback control by said control circuit in a case where said apparatus executes, among plural operations therein, a predetermined operation involving a change in a drive load state.

27. An apparatus according to claim 26, wherein said restriction means is adapted to restrict the response by varying a control parameter determining the response of the feedback control.

28. An apparatus according to claim 26, wherein said vibration wave motor generates a driving force by applying a frequency signal to an electromechanical energy conversion element.

29. A control device for a vibration wave motor in which a vibration is excited in a vibration member to generate a driving force by applying a frequency signal to an electromechanical energy conversion element, comprising:

feedback control means for detecting a drive state of the motor and controlling the frequency signal; and an operation control unit adapted, in a state of generation of a change in a driven load, for inhibiting the feedback control during said state;

wherein said operation control unit is adapted, during a period the feedback control is inhibited, to apply a predetermined frequency signal to said electromechanical energy conversion element, and wherein said predetermined frequency signal is the frequency signal applied immediately before the feedback control is inhibited.

30. A control device for a vibration wave motor in which a vibration is excited in a vibration member to generate a driving force by applying a frequency signal to an electromechanical energy conversion element, comprising:

feedback control means for detecting a drive state of the motor and controlling the frequency signal; and an operation control unit adapted, in a state of generation of a change in a driven load, for inhibiting the feedback control during said state, wherein said operation control unit is adapted to inhibit the feedback control in a case where said device executes, among plural driving operations for said motor, a predetermined operation.

31. A control device for a vibration wave motor in which a vibration is excited in a vibration member to generate a driving force by applying a frequency signal to an electromechanical energy conversion element, comprising:

feedback control means for detecting a drive state of the motor and controlling the frequency signal; and an operation control unit adapted, in a state of generation of a change in a driven load, for inhibiting the feedback control during said state, wherein said operation control unit is adapted to inhibit the feedback control in the execution of an operation in which the variation in the load is predicted.

32. A control device for a vibration wave motor in which a vibration is excited in a vibration member to generate a driving force by applying a frequency signal to an electromechanical energy conversion element provided on said vibration member, comprising:

feedback control means for detecting a drive state of the motor and controlling the frequency signal; and an operation control unit adapted, in a state of generation of a change in a driven load, for restricting a response of the feedback control during said state, wherein said operation control unit is adapted to restrict a response of the feedback control in a case where said device executes, among plural driving operations for said motor, a predetermined operation.

33. A control device for a vibration wave motor in which a vibration is excited in a vibration member to generate a driving force by applying a frequency signal to an electromechanical energy conversion element provided on said vibration member, comprising:

feedback control means for detecting a drive state of the motor and controlling the frequency signal; and an operation control unit adapted for a predictable generation of a change in a driven load, and for restricting a response of the feedback control during a period of a predicted load variation.

* * * * *

UNITED STATES PATENT AND TRADEMARK OFFICE
CERTIFICATE OF CORRECTION

PATENT NO. : 6,285,145 B1
DATED : September 4, 2001
INVENTOR(S) : Toshihiko Otsubo et al.

Page 1 of 1

It is certified that error appears in the above-identified patent and that said Letters Patent is hereby corrected as shown below:

<u>Column 8,</u>
Line 63, "5-7,control" should read -- 5-7, control --.

Signed and Sealed this

Second Day of April, 2002

Attest:

JAMES E. ROGAN
*Attesting Officer*  *Director of the United States Patent and Trademark Office*